US011880219B2

(12) United States Patent

Fukushima

(10) Patent No.: US 11,880,219 B2

(45) Date of Patent: Jan. 23, 2024

(54) ROTATIONALLY OPERATED ELECTRONIC COMPONENT

(71) Applicant: TOKYO COSMOS ELECTRIC CO., LTD., Zama (JP)

(72) Inventor: Hajime Fukushima, Kanagawa (JP)

(73) Assignee: TOKYO COSMOS ELECTRIC CO., LTD., Zama (JP)

(*) Notice: Subject to any disclaimer, the term of this patent is extended or adjusted under 35 U.S.C. 154(b) by 0 days.

(21) Appl. No.: 17/788,944

(22) PCT Filed: Jan. 22, 2021

(86) PCT No.: PCT/JP2021/002130

§ 371 (c)(1),
(2) Date: Jun. 24, 2022

(87) PCT Pub. No.: WO2021/153432

PCT Pub. Date: Aug. 5, 2021

(65) Prior Publication Data

US 2022/0357760 A1 Nov. 10, 2022

(30) Foreign Application Priority Data

Jan. 27, 2020 (JP) ................................ 2020-010788

(51) Int. Cl.

*G05G 1/08* (2006.01)
*G05G 5/03* (2008.04)
*H01C 10/30* (2006.01)

(52) U.S. Cl.

CPC ................. *G05G 1/08* (2013.01); *G05G 5/03* (2013.01); *H01C 10/30* (2013.01)

(58) Field of Classification Search

None
See application file for complete search history.

(56) References Cited

U.S. PATENT DOCUMENTS 9,412,538 B2 * 8/2016 Fukunaga ................ H01H 3/08
9,741,511 B2 * 8/2017 Fukushima ............ H01H 19/14

FOREIGN PATENT DOCUMENTS

JP 2003178649 A 6/2003
JP 2011209876 A 10/2011

OTHER PUBLICATIONS

International Search Report for International Application No. PCT/JP2021/002130; dated Mar. 30, 2021.

* cited by examiner

*Primary Examiner* — Vicky A Johnson
(74) *Attorney, Agent, or Firm* — CANTOR COLBURN LLP

(57) ABSTRACT

This rotationally operated electronic component, with which it is possible to obtain a fixed, high operating torque in both of two shafts, is provided with: a first block body which is disposed on one side in an axial direction, and which has a first hole; a second block body which is disposed on the other side in the axial direction, and which has a second hole; an outside operating shaft having a first cylindrical portion which fits into the first hole in such a way as to rotate about the axis; an inside operating shaft which extends in the axial direction, penetrates through the first cylindrical portion and the second hole, and fits into the first cylindrical portion in such a way as to rotate about the axis; a rotating body which is fitted onto the inside operating shaft in such a way as to rotate integrally with the inside operating shaft, and which has a second cylindrical portion that fits into the second hole in such a way as to rotate about the axis; a first radial direction resilient member which is sandwiched in a radial gap between the inner circumferential surface of the first hole and the outer circumferential surface of the first cylindrical portion while being flexed against a restoring force; and a second radial direction resilient member which (Continued)

is sandwiched in a radial gap between the inner circumferential surface of the second hole and the outer circumferential surface of the second cylindrical portion while being flexed against a restoring force.

2 Claims, 2 Drawing Sheets

ROTATIONALLY OPERATED ELECTRONIC COMPONENT

CROSS REFERENCE TO RELATED APPLICATIONS

This is the U.S. national stage of application No. PCT/JP2021/002130, filed on Jan. 22, 2021. Priority under 35 U.S.C. § 119(a) and 35 U.S.C. § 365(b) is claimed from Japanese Application No. 2020-010788 filed Jan. 27, 2020, the disclosure of which is also incorporated herein by reference.

TECHNICAL FIELD

The present invention relates to a rotationally operated electronic component.

BACKGROUND ART

Patent Literature (hereinafter, referred to as PTL) 1, for example, discloses a rotationally operated electronic component with a first rotating electronic component and a second rotating electronic component placed far from each other in the axis direction.

The first rotating electronic component includes a shaft supporting member that is fixed to a first base, a first rotating object that is rotatably supported by the shaft supporting member, a first click spring that has an elastic section and is interposed between the shaft supporting member and the first rotating object, and a first click plate that has a plurality of click engagement holes in the circumferential direction and is placed facing the first click spring.

The second rotating electronic component includes a case and a second base that are fixed to the shaft supporting member, a second rotary knob and a second rotating object that are rotatably supported by the case, a lock pin that is the center of rotation of the second rotating object, a second click spring that has an elastic section and is interposed between the second rotating object and the case, and a second click plate that has a plurality of click engagement holes in the circumferential direction and is placed facing the second click spring.

The elastic sections of the first and second click springs are configured to repeat insertion/removal to/from the click engagement holes of the first and second click plates, so that an operator feels the click.

CITATION LIST

Patent Literature

PTL 1

Japanese Patent Application Laid-Open No. 2003-178649

SUMMARY OF INVENTION

Technical Problem

In the rotationally operated electronic component disclosed in PTL 1, for example, the operation torque varies between a case where the elastic section is removed from the click engagement hole and the other cases; accordingly, both the first and second rotating objects (two shafts) cannot acquire constant high operation torque.

This makes it difficult to hold the two shafts in desired positions. As another problem, for example, the rotation of one of the first and second rotating objects causes the other rotating object to rotate.

It is an object of the present invention to provide a rotationally operated electronic component in which both two shafts can acquire constant high operation torque.

Solution to Problem

To achieve the above object, a rotationally operated electronic component according to the present invention includes:

- a first block body that is placed on one side of an axis direction and includes a first hole;
- a second block body that is placed on another side of the axis direction and includes a second hole;
- an outer operating shaft that includes a first cylindrical section fitting within the first hole to rotate about an axis;
- an inner operating shaft that extends in the axis direction, penetrates through the first cylindrical section and the second hole, and fits within the first cylindrical section to rotate about the axis;
- a rotating body that includes a second cylindrical section fitting over the inner operating shaft to rotate integrally with the inner operating shaft and fitting within the second hole to rotate about the axis;
- a first radial-direction elastic member that is put, in a flexed state against resilience, in a radial-direction gap between an inner circumferential surface of the first hole and an outer circumferential surface of the first cylindrical section; and
- a second radial-direction elastic member that is put, in a flexed state against resilience, in a radial-direction gap between an inner circumferential surface of the second hole and an outer circumferential surface of the second cylindrical section.

Advantageous Effects of Invention

According to a rotationally operated electronic component of the present invention, it is possible for both two shafts to acquire constant high operation torque.

DESCRIPTION OF EMBODIMENTS

Figure 1:
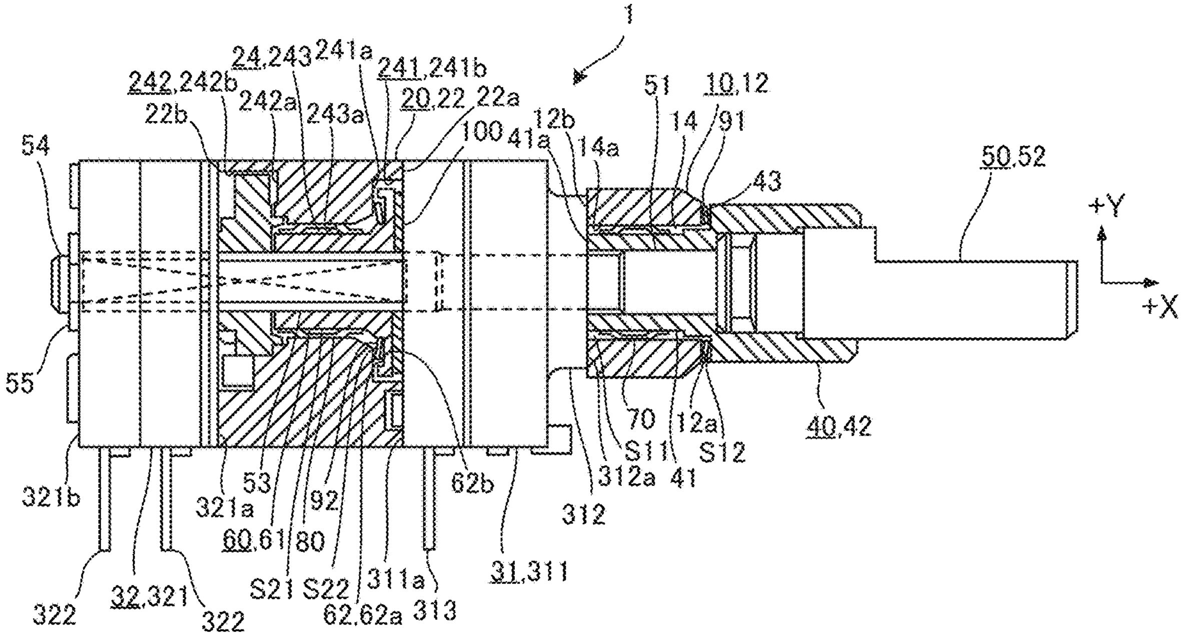
FIG. 1 is a partial cross-sectional view illustrating a configuration of a rotationally operated electronic component according to an embodiment of the present invention.

Hereinafter, embodiments of the present disclosure will be described in detail with reference to the accompanying drawings. FIG. 1 is a partial cross-sectional view illustrating a configuration of rotationally operated electronic component 1 according to an embodiment of the present invention. An X axis and a Y axis are illustrated in FIG. 1. In FIG. 1, the right-left direction is referred to as the X direction or axis direction. The right direction is referred to as the one side of the axis direction or "+X direction", and the left direction is referred to as the other side of the axis direction or "−X direction". Additionally, in FIG. 1, the upper-lower direction is referred to as the radial direction or Y direction. The direction away from the X axis in the Y direction is referred to as the outer radial direction or "+Y direction", and the direction approaching the X axis from the Y direction is referred to as the inner radial direction or "−Y direction".

As illustrated in FIG. 1, rotationally operated electronic component 1 includes first block body 10, second block body 20, a plurality of electrical signal control sections 31 and 32, outer operating shaft 40, inner operating shaft 50, rotating body 60, first radial-direction elastic member 70, second radial-direction elastic member 80, first axis-direction elastic member 91, and second axis-direction elastic member 92. Note that the inner configurations of electrical signal control sections 31 and 32 are not illustrated in FIG. 1.

First block body 10 is placed on the one side of the axis direction (+X direction). First block body 10 includes cylindrical section 12. Cylindrical section 12 includes first hole 14 penetrating in the axis direction (X direction). First hole 14 is defined by inner circumferential surface 14*a* connecting axis-direction one-side end surface 12*a* of cylindrical section 12 and axis-direction the-other-side end surface 12*b* of cylindrical section 12.

Second block body 20 is placed on the other side of the axis direction (−X direction). Second block body 20 includes rectangular parallelepiped block section 22. Block section 22 includes second hole 24 penetrating in the axis direction (X direction).

Second hole 24 includes first space 241 located on the one side of the axis direction, second space 242 located on the other side of the axis direction, and third space 243 located in the middle of the axis direction. First space 241 is defined by annular surface 241*a* facing the right direction and inner circumferential surface 241*b* connecting surface 241*a* and axis-direction one-side end surface 22*a* of block section 22. Second space 242 is defined by surface 242*a* facing the left direction and inner circumferential surface 242*b* connecting surface 242*a* and axis-direction the-other-side end surface 22*b* of block section 22. Third space 243 is defined by inner circumferential surface 243*a* connecting surface 241*a* and surface 242*a*.

Electrical signal control section 31 is placed in a gap in the axis direction between first block body 10 and second block body 20. Electrical signal control section 31 corresponds to a "third block body" of the present invention.

Electrical signal control section 31 includes housing 311, seat section 312, and terminal 313 inputting and outputting an electrical signal. Housing 311 has a rectangular parallelepiped shape. Housing 311 accommodates a variable resistor (not illustrated) rotationally driven by outer operating shaft 40. Axis-direction the-other-side end surface 311*a* of housing 311 makes contact with axis-direction one-side end surface 22*a* of block section 22. Seat section 312 is placed on the one side (right side) of housing 311 in the axis direction. Seat section 312 includes seat surface 312*a* making contact with axis-direction the-other-side end surface 12*b* of cylindrical section 12.

Electrical signal control section 32 is placed on the other side of second block body 20 in the axis direction. Electrical signal control section 32 includes housing 321, and terminal 322 inputting and outputting an electrical signal. Housing 321 has a rectangular parallelepiped shape. Housing 321 accommodates a variable resistor (not illustrated) rotationally driven by inner operating shaft 50, and a switch (not illustrated). Axis-direction one-side end surface 321*a* of housing 321 makes contact with axis-direction the-other-side end surface 22*b* of block section 22.

Outer operating shaft 40 includes first cylindrical section 41 and first large-diameter cylindrical section 42. First cylindrical section 41 fits within first hole 14 to rotate about the axis. Radial-direction gap S11 with a predetermined width is provided between the inner circumferential surface of first hole 14 and the outer circumferential surface of first cylindrical section 41. The size of the shape of radial-direction gap S11 is set by the inner diameter of first hole 14 and the outer diameter of first cylindrical section 41. Axis-direction the-other-side end surface 41*a* of first cylindrical section 41 makes contact with seat surface 312*a*.

First large-diameter cylindrical section 42 is placed on the one side of first cylindrical section 41 in the axis direction (+X direction), and its diameter is larger than that of first cylindrical section 41. Annular surface 43 facing the left direction is placed between the outer circumferential surface of first cylindrical section 41 and the outer circumferential surface of first large-diameter cylindrical section 42. Axis-direction gap S12 with a predetermined width is provided between surface 43 and axis-direction one-side end surface 12*a*.

Inner operating shaft 50 extends in the axis direction (X direction). Inner operating shaft 50 penetrates through first cylindrical section 41, the inside of seat section 312, the inside of housing 311, second hole 24, and the inside of housing 321. Inner operating shaft 50 includes small diameter section 51, large diameter section 52, and rotation prevention section 53. Small diameter section 51 fits within first cylindrical section 41 to rotate about the axis. Large diameter section 52 is placed on the one side of small diameter section 51 in the axis direction (+X direction), and its diameter is larger than that of small diameter section 51. An operation knob (not illustrated) is attached to large diameter section 52. Rotation prevention section 53 is placed on the other side of small diameter section 51 in the axis direction (−X direction).

Axis-direction the-other-side end section 54 of inner operating shaft 50 protrudes in the left direction (−X direction) from axis-direction the-other-side end surface 321*b* of housing 321. Retaining ring 55 is attached to axis-direction the-other-side end section 54 of inner operating shaft 50.

Rotating body 60 includes second cylindrical section 61 and second large-diameter cylindrical section 62. Second cylindrical section 61 fits over rotation prevention section 53 and fits within third space 243. Radial-direction gap S21 with a predetermined width is provided between the outer circumferential surface of second cylindrical section 61 and the inner circumferential surface of third space 243. The size of the shape of radial-direction gap S21 is set by the inner diameter of third space 243 and the outer diameter of second cylindrical section 61. In the present embodiment, the shape of radial-direction gap S21 is set to the same size as the shape of radial-direction gap S11. Second large-diameter cylindrical section 62 fits over rotation prevention section 53 and fits within first space 241. Rotating body 60 rotates integrally with inner operating shaft 50 as second cylindrical section 61 and second large-diameter cylindrical section 62 fit over rotation prevention section 53.

Second large-diameter cylindrical section 62 is placed on the one side of second cylindrical section 61 in the axis direction, and its diameter is larger than that of second cylindrical section 61. Second large-diameter cylindrical section 62 includes annular surface 62*a* facing the left direction. Axis-direction gap S22 with a predetermined width is provided between surface 62*a* and surface 241*a*.

Figure 2:
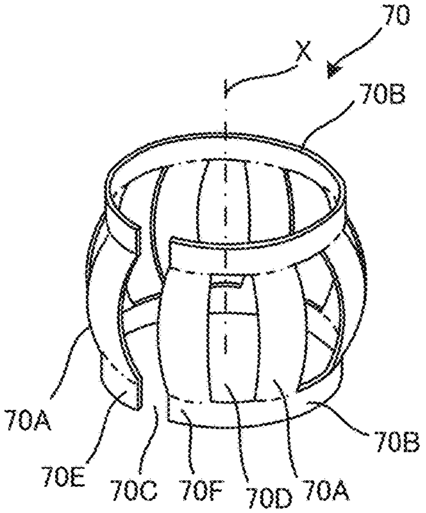
FIG. 2 is a perspective view illustrating an exemplary first radial-direction elastic member.

Next, exemplary first radial-direction elastic member 70 will be described with reference to FIGS. 1 and 2. FIG. 2 is a perspective view illustrating exemplary first radial-direction elastic member 70.

First radial-direction elastic member 70 is placed in radial-direction gap S11 with a predetermined width. First radial-direction elastic member 70 is formed by a rectangular metal plate with resilience. The metal plate has rectangular slits 70D that are long in the short side direction of the metal plate, and slits 70D are arranged parallel to each other in the long side direction at constant intervals. This forms a plurality of rectangular spring plates 70A with one ends connected to connecting strip 70B and the other ends connected to another connecting strip 70B. The longitudinal central area of each spring plate 70A is press-formed so as to have a curved projection on the same one side relative to the surface of the original metal plate. Spring plates 70A are rounded so that the longitudinal central area of each spring plate 70A is convex outward in the radial direction and both ends 70E and 70F of the metal plate in the long side direction are adjacent to each other, and this results in a cylindrical spring. In the cylindrical spring, connecting strips 70B act as fulcrums of spring plates 70A at both ends, and the longitudinal central areas of spring plates 70A act as the points of action.

First radial-direction elastic member 70 is set so that its smallest inner diameter (inner diameter of connecting strip 70B) is smaller than the outer diameter of first cylindrical section 41 in the free state. Thus, when first radial-direction elastic member 70 is mounted on first cylindrical section 41, gap 70C between both ends 70E and 70F of the metal plate in the long side direction spreads against the resilience, and first radial-direction elastic member 70 is held in first cylindrical section 41 by the resilience. In this state, the largest outer diameter of first radial-direction elastic member 70 (outer diameter in the longitudinal central areas of spring plates 70A) is set to be larger than the diameter of first hole 14.

When outer operating shaft 40 with first radial-direction elastic member 70 mounted is inserted into first hole 14, spring plates 70A are pressed by the inner circumferential surface of first hole 14, and the height of spring plates 70A in the radial direction decreases inward in the radial direction. Outer operating shaft 40 rotates with first radial-direction elastic member 70, and first radial-direction elastic member 70 slides and rotates against the inner circumferential surface of first hole 14. Accordingly, outer operating shaft 40 receives frictional resistance from the inner circumferential surface of first hole 14 via first radial-direction elastic member 70, thereby acquiring torque required for the rotation operation.

Next, second radial-direction elastic member 80 will be described with reference to FIGS. 1 and 2. Second radial-direction elastic member 80 is a shared component commonly used as first radial-direction elastic member 70. The reason why the shared component is used is that the shapes of radial-direction gap S21 and radial-direction gap S11 are set to the same size, as described above. Note that second radial-direction elastic member 80 will be described using the same reference signs as those for first radial-direction elastic member 70.

Second radial-direction elastic member 80 is placed in radial-direction gap S21 with a predetermined width. Second radial-direction elastic member 80 is set so that its smallest inner diameter (inner diameter of connecting strip 70B) is smaller than the outer diameter of second cylindrical section 61 in the free state. Thus, when second radial-direction elastic member 80 is mounted on second cylindrical section 61, gap 70C between both ends 70E and 70F of the metal plate in the long side direction spreads against the resilience, and second radial-direction elastic member 80 is held in second cylindrical section 61 by the resilience. In this state, the largest outer diameter of second radial-direction elastic member 80 (outer diameter in the longitudinal central areas of spring plates 70A) is set to be larger than the diameter of second hole 24.

Rotating body 60 rotates integrally with inner operating shaft 50 by fitting over rotation prevention section 53 of inner operating shaft 50. Second radial-direction elastic member 80 is mounted on second cylindrical section 61 of rotating body 60 as described above. When rotating body 60 with second radial-direction elastic member 80 mounted is inserted into second hole 24, spring plates 70A are pressed by the inner circumferential surface of second hole 24, and the height of spring plates 70A in the radial direction decreases inward in the radial direction. Inner operating shaft 50, which rotates integrally with rotating body 60, rotates with second radial-direction elastic member 80, and second radial-direction elastic member 80 slides and rotates against the inner circumferential surface of second hole 24. Accordingly, inner operating shaft 50 (rotating body 60) receives frictional resistance from the inner circumferential surface of second hole 24 via second radial-direction elastic member 80, thereby acquiring torque required for the rotation operation.

Next, first axis-direction elastic member 91 will be described with reference to FIG. 1. First axis-direction elastic member 91 is, for example, a spring washer that is put in axis-direction gap S12 in a flexed state against the resilience. Outer operating shaft 40 slides and rotates against first axis-direction elastic member 91. Accordingly, outer operating shaft 40 receives frictional resistance from first axis-direction elastic member 91, thereby acquiring torque required for the rotation operation.

Next, second axis-direction elastic member 92 will be described with reference to FIG. 1. Second axis-direction elastic member 92 is a shared component commonly used as first axis-direction elastic member 91. The reason why the shared component is used is that the widths of axis-direction gap S21 and axis-direction gap S22 are set to be the same. Second axis-direction elastic member 92 is put in axis-direction gap S22 in a flexed state against the resilience. Rotating body 60, which rotates integrally with inner operating shaft 50, slides and rotates against second axis-direction elastic member 92. Accordingly, inner operating shaft 50 (rotating body 60) receives frictional resistance from second axis-direction elastic member 92, thereby acquiring torque required for the rotation operation. Note that, in order to improve the operability, it is preferable that the operation torque of inner operating shaft 50 and the operation torque of outer operating shaft 40 are within a predetermined range.

Incidentally, axis-direction gap S22 varies due to a factor such as a dimensional tolerance of a component. With large axis-direction gap S22, the frictional resistance from second axis-direction elastic member 92 decreases and the operation torque of inner operating shaft 50 decreases. With small axis-direction gap S22, the frictional resistance from second axis-direction elastic member 92 increases and the operation torque of inner operating shaft 50 increases. The variation in axis-direction gap S22 sometimes causes the operation torque of inner operating shaft 50 to fall outside the predetermined range.

Torque adjusting member 100 is placed in an axis-direction gap between axis-direction one-side end surface 62*b* of second large-diameter cylindrical section 62 and axis-direction the-other-side end surface 311*a* of housing 311, and adjusts the operation torque of inner operating shaft 50. Torque adjusting member 100 is a washer, for example. The operation torque of inner operating shaft 50 is adjusted by selectively using a washer that fits the axis-direction gap among a plurality of types of washers with different plate thicknesses.

Rotationally operated electronic component 1 according to the above embodiment includes: first block body 10 that is placed on one side of an axis direction and includes first hole 14; second block body 20 that is placed on another side of the axis direction and includes second hole 24; outer operating shaft 40 that includes first cylindrical section 41 fitting within first hole 14 to rotate about an axis; inner operating shaft 50 that extends in the axis direction, penetrates through first cylindrical section 41 and second hole 24, and fits within first cylindrical section 41 to rotate about the axis; rotating body 60 that includes second cylindrical section 61 fitting over inner operating shaft 50 to rotate integrally with inner operating shaft 50 and fitting within second hole 24 to rotate about the axis; first radial-direction elastic member 70 that is put, in a flexed state against resilience, in radial-direction gap S11 between an inner circumferential surface of first hole 14 and an outer circumferential surface of first cylindrical section 41; and second radial-direction elastic member 80 that is put, in a flexed state against resilience, in radial-direction gap S21 between an inner circumferential surface of second hole 24 and an outer circumferential surface of second cylindrical section 61.

With the above configuration, when outer operating shaft 40 is rotated, it receives frictional resistance from the inner circumferential surface of first hole 14 via first radial-direction elastic member 70, thereby acquiring torque required for the rotation operation. In addition, when inner operating shaft 50 is rotated, it receives frictional resistance from the inner circumferential surface of second hole 24 via second radial-direction elastic member 80, thereby acquiring torque required for the rotation operation. In such a manner, both of the two shafts (outer operating shaft 40 and inner operating shaft 50) can acquire constant high operation torque.

Rotationally operated electronic component 1 according to the above embodiment further includes: first axis-direction elastic member 91 that is put in axis-direction gap S12 in a flexed state against the resilience; and second axis-direction elastic member 92 that is put in axis-direction gap S22 in a flexed state against the resilience. This allows both of the two shafts to acquire higher operation torque.

Further, rotationally operated electronic component 1 according to the above embodiment includes a washer (torque adjusting member) that is placed in the axis-direction gap between second large-diameter cylindrical section 62 and housing 311 and adjusts the operation torque of the inner operating shaft. This allows the operation torque of inner operating shaft 50 to be adjusted by selectively using a washer that fits the above axis-direction gap among a plurality of types of washers with different plate thicknesses.

Next, variations of rotationally operated electronic component 1 according to the above embodiment will be described with reference to FIGS. 3A and 3B. The description of the variations is mainly about configurations different from those in the above embodiment. The same reference signs are given to the same configurations, and descriptions thereof are omitted. Note that axis-direction gap S22 is highlighted in variation 1 illustrated in FIG. 3A and variation 2 illustrated in FIG. 3B.

In variation 2, the operation torque of inner operating shaft 50 is adjusted without using a washer (torque adjusting member).

Figure 3A:
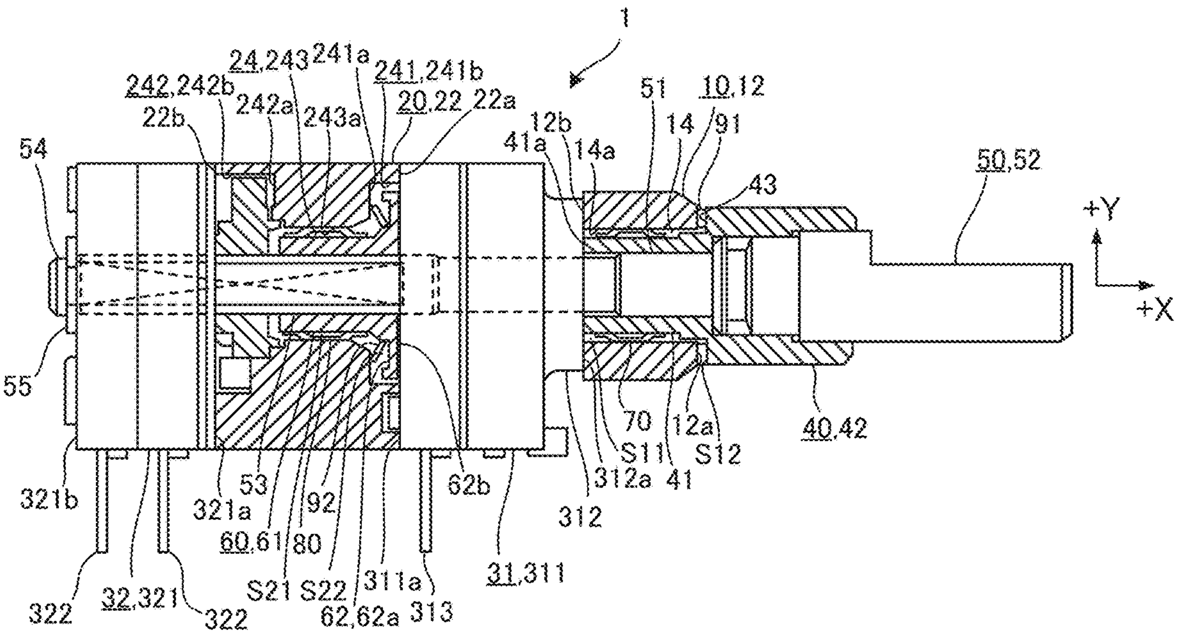
FIG. 3A is a partial cross-sectional view illustrating a configuration of a rotationally operated electronic component according to variation 1.

The reason why axis-direction gap S22 is large as illustrated in FIG. 3A is that, for example, when the operation torque of inner operating shaft 50 is larger than the operation torque of outer operating shaft 40 and exceeds a predetermined range, rotating body 60 including second large-diameter cylindrical section 62 with thinner plate is selected, for example, to make axis-direction gap S22 larger than a standard width, so that the operation torque of inner operating shaft 50 is reduced and fallen within the predetermined range.

Figure 3B:
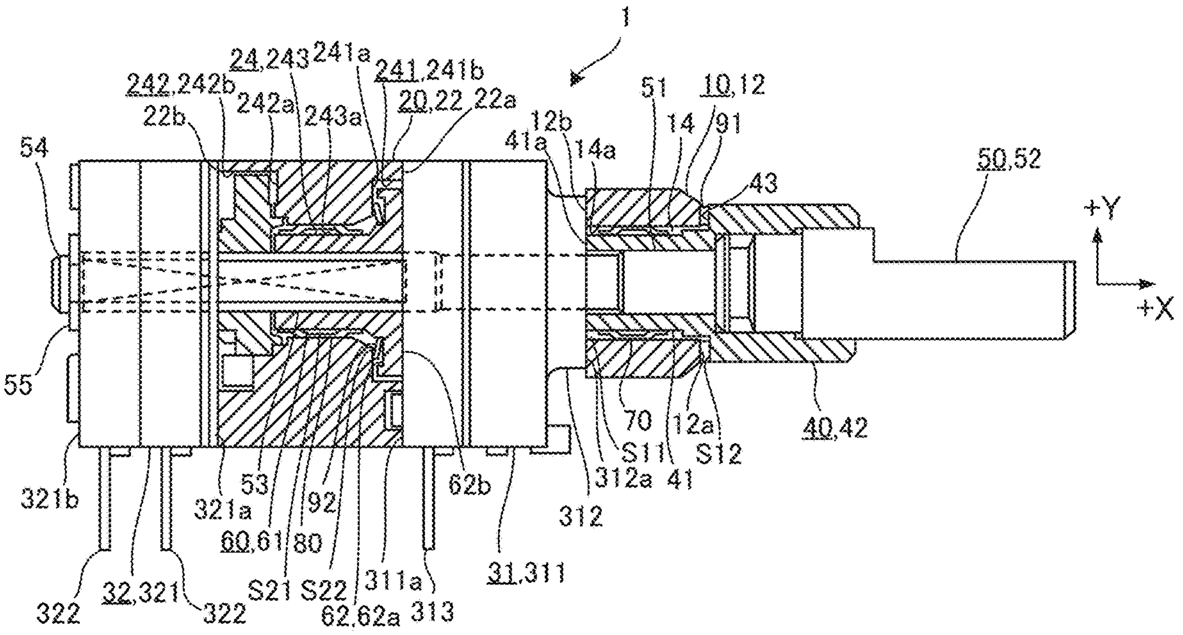
FIG. 3B is a partial cross-sectional view illustrating a configuration of a rotationally operated electronic component according to variation 2.

The reason why axis-direction gap S22 is small as illustrated in FIG. 3B is that, for example, when the operation torque of inner operating shaft 50 is smaller than the operation torque of outer operating shaft 40 and below a predetermined range, rotating body 60 including second large-diameter cylindrical section 62 with thicker plate is selected, for example, to make axis-direction gap S22 smaller than a standard width, so that the operation torque of inner operating shaft 50 is increased and fallen within the predetermined range.

According to the above variations, for example, it is possible to adjust the operation torque of inner operating shaft 50 by selectively using suitable rotating body 60 from a plurality of types of rotating bodies 60 including second large-diameter cylindrical sections 62 with different plate thicknesses.

The all of the above embodiments are merely examples to implement the present invention, and the technical scope of the present invention should not be interpreted as limited by these embodiments. In other words, the present invention can be implemented in various forms without departing from the gist or main features thereof.

In the above embodiments, rotationally operated electronic component 1 is provided with both first and second axis-direction elastic members 91 and 92, but the present invention is not limited to this, and rotationally operated electronic component 1 needs to be provided with either one of first and second axis-direction elastic members 91 and 92, for example, or may be provided with neither of first and second axis-direction elastic members 91 and 92 because adequate operation torque can be acquired by first and second radial-direction elastic members 70 and 80, for example.

The disclosure of Japanese Patent Application No. 2020-010788, filed on Jan. 27, 2020, including the specification, drawings and abstract, is incorporated herein by reference in its entirety.

INDUSTRIAL APPLICABILITY

The present invention is suitably used for an electronic device including a rotationally operated electronic component in which its two shafts are required to acquire constant high operation torque.

REFERENCE SIGNS LIST

1 Rotationally operated electronic component
10 First block body

12 Cylindrical section
12*a* Axis-direction one-side end surface
12*b* Axis-direction the-other-side end surface
14 First hole
14*a*, 241*b*, 242*b*, 243*a* Inner circumferential surface
20 Second block body
22 Block section
22*a* Axis-direction one-side end surface
22*b* Axis-direction the-other-side end surface
24 Second hole
31, 32 Electrical signal control section
40 Outer operating shaft
41 First cylindrical section
42 First large-diameter cylindrical section
43, 62*a*, 241*a*, 242*a* Surface
50 Inner operating shaft
51 Small diameter section
52 Large diameter section
53 Rotation prevention section
54 Axis-direction the-other-side end section
55 Retaining ring
60 Rotating body
61 Second cylindrical section
62 Second large-diameter cylindrical section
62*b* Axis-direction one-side end surface
70 First radial-direction elastic member
70A Spring plate
70B Connecting strip
70C Gap
70D Slit
70E, 70F End
80 Second radial-direction elastic member
91 First axis-direction elastic member
92 Second axis-direction elastic member
100 Torque adjusting member
241 First space
242 Second space
243 Third space
311 Housing
311*a*, 321*b* Axis-direction the-other-side end surface
312 Seat section
312*a* Seat surface
313, 322 Terminal
321 Housing
321*a* Axis-direction one-side end surface

The invention claimed is:

1. A rotationally operated electronic component, comprising:
- a first block body that is placed on one side of an axis direction and includes a first hole,
- a second block body that is placed on another side of the axis direction and includes a second hole,
- an outer operating shaft that includes a first cylindrical section fitting within the first hole to rotate about an axis,
- an inner operating shaft that extends in the axis direction, penetrates through the second hole, and fits within the first cylindrical section to rotate about the axis,
- a rotating body that includes a second cylindrical section fitting over the inner operating shaft to rotate integrally with the inner operating shaft and fitting within the second hole to rotate about the axis,
- a first radial-direction elastic member that is put, in a flexed state against resilience, in a radial-direction gap between an inner circumferential surface of the first hole and an outer circumferential surface of the first cylindrical section; and
- a second radial-direction elastic member that is put, in a flexed state against resilience, in a radial-direction gap between an inner circumferential surface of the second hole and an outer circumferential surface of the second cylindrical section,
- wherein the outer operating shaft includes a first large-diameter cylindrical section that is placed on the one side of the first cylindrical section in the axis direction and that has a diameter larger than a diameter of the first cylindrical section,
- the rotating body includes a second large-diameter cylindrical section that is placed on the one side of the second cylindrical section in the axis direction and that has a diameter larger than a diameter of the second cylindrical section, and
- the rotationally operated electronic component further includes:
  - a first axis-direction elastic member that is put, in a flexed state against resilience, in an axis-direction gap between a rim of the first hole and the first large-diameter cylindrical section; and
  - a second axis-direction elastic member that is put, in a flexed state against resilience, in an axis-direction gap between a rim of the second hole and the second large-diameter cylindrical section.

2. The rotationally operated electronic component according to claim claim 1, further comprising:
- a third block body that is placed in an axis-direction gap between the first block body and the second block body and that includes a third hole through which the inner operating shaft is inserted; and
- a torque adjusting member that is placed in an axis-direction gap between the second large-diameter cylindrical section and the third block body and that adjusts operation torque of the inner operating shaft.

* * * * *